Sept. 23, 1952 F. E. RUNGE 2,611,620

RECORD MARKER FOR DICTATING MACHINES

Filed Aug. 24, 1948 4 Sheets-Sheet 1

INVENTOR
FRANK E. RUNGE
BY H. G. Manning
ATTORNEY

Sept. 23, 1952 F. E. RUNGE 2,611,620

RECORD MARKER FOR DICTATING MACHINES

Filed Aug. 24, 1948 4 Sheets-Sheet 2

INVENTOR
FRANK E. RUNGE
BY H. G. Manning
ATTORNEY

RECORD MARKER FOR DICTATING MACHINES

Filed Aug. 24, 1948 4 Sheets-Sheet 3

INVENTOR
FRANK E. RUNGE
BY H. G. Manning
ATTORNEY

Sept. 23, 1952 F. E. RUNGE 2,611,620

RECORD MARKER FOR DICTATING MACHINES

Filed Aug. 24, 1948 4 Sheets-Sheet 4

INVENTOR
FRANK E. RUNGE
BY H. G. Manning
ATTORNEY

Patented Sept. 23, 1952 2,611,620

UNITED STATES PATENT OFFICE 2,611,620

RECORD MARKER FOR DICTATING MACHINES

Frank E. Runge, Branford, Conn., assignor to The Soundscriber Corporation, New Haven, Conn., a corporation of Connecticut Application August 24, 1948, Serial No. 45,952

9 Claims. (Cl. 274—13)

This invention relates to dictating machines of the type having a phonographic recording arm which is movable across a record member to form record grooves therein, and more particularly to a manually-operable device for actuating said arm to make indexing marks upon the record member.

In the use of dictating machines, it is quite usual for the operator to dictate a number of letters in succession upon a single record. Further, during dictation the operator often realizes that he has made an error which he does not wish to appear in the transcription, so that some means is necessary to call the error and the subsequent correction to the attention of the person who is to transcribe the record.

For these reasons, and to avoid the loss of time, it is customary to provide an index for each of the records made upon the dictating machine so that a person later transcribing or referring to the record may easily find the location of the corrections, the letter endings, and other special points which may occur thereon.

Heretofore such indexes have been kept upon sheets or strips of paper which were marked by the operator of the dictating machine, thus requiring him to interrupt his train of thought and causing delay. Further, these sheets or strips were an added encumbrance, and were likely to be mislaid.

Accordingly, one object of this invention is to provide a device whereby wide spaces may be formed at desired points between the grooves of the record member during the recording operation so as to provide a visible index upon the record member itself, whereby separate index strips or sheets will be unnecessary.

Another object is to provide a device of the above nature which includes means for preserving the continuity of the spiral grooves across the wide index spaces, whereby the operation of a playback will not be interrupted by said spaces.

Another object is to provide a device of the above nature which includes means whereby the device may be actuated by a simple motion of the operator's finger, whereby a minimum of attention on the part of the operator will be required.

Another object is to provide a device mounted on the recording arm for laterally moving said arm to produce an indexing space on the record.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

Figure 1:
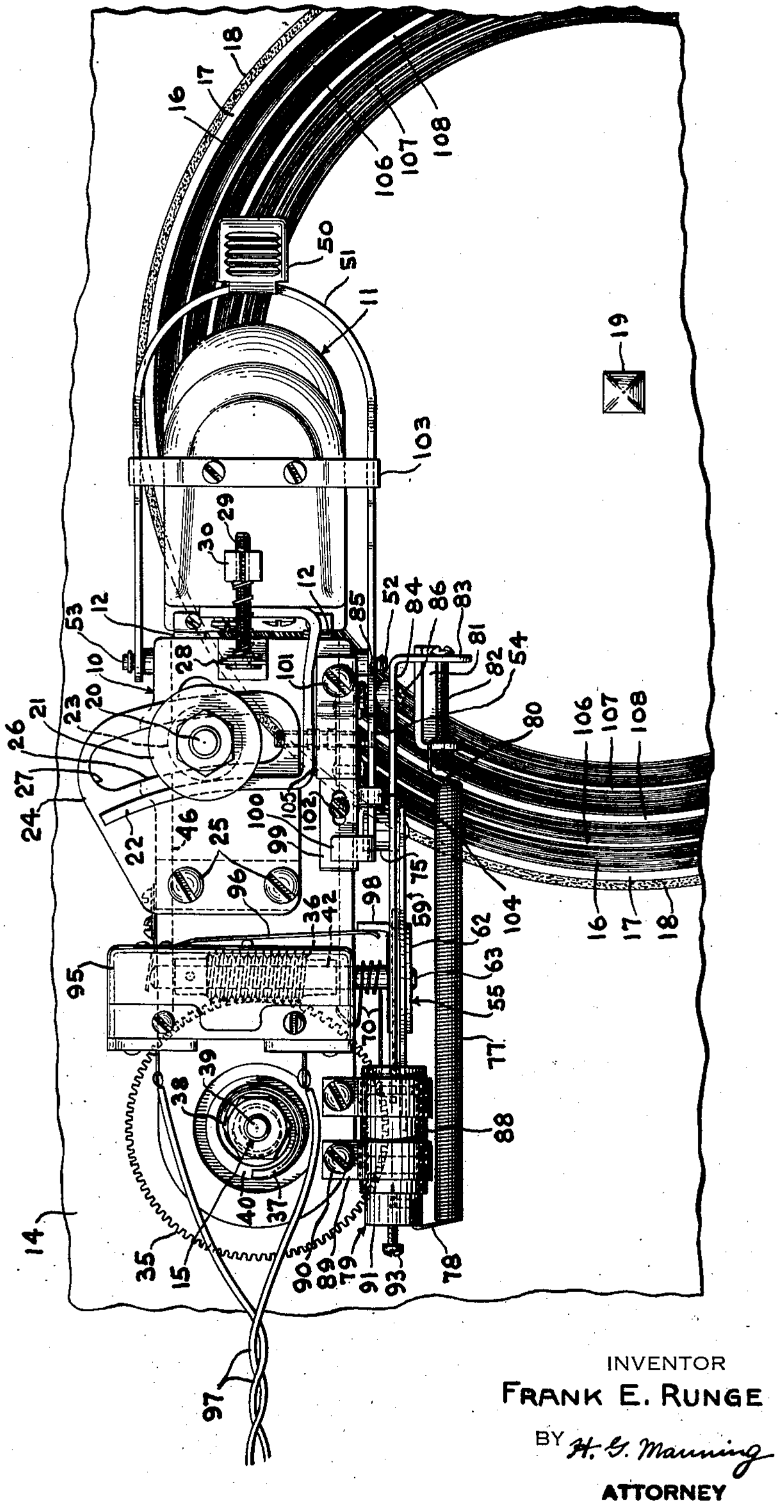
Fig. 1 is a plan view of a portion of a dictating machine showing a recording arm having the improved record marker thereon.

Referring now to the drawings, in which like reference numerals denote corresponding parts throughout the several views, the numeral 10 indicates a recording arm, the front end of which supports a vertically swingable recording head 11 by means of a flexible hinge strip 12, said recording head being provided with a recording stylus 13.

The recording arm 10 preferably is of the type disclosed in the copending application of Lincoln Thompson, entitled Phonograph Recording Arm Clamps, Serial Number 615,223, filed September 8, 1945, patented August 9, 1949, Number 2,478,722, and is supported above a horizontal chassis plate 14 and adapted to be slowly swung by means of a vertical feed shaft 15 (to be further described hereinafter) so that the stylus 13 may form closely spaced record grooves 16 upon the surface of a record disk 17 which is carried upon a horizontal turntable 18. The turntable 18 is supported above the chassis plate 14 and is adapted to be rotated by means of a turntable shaft 19.

In order to hold the recording head 11 in a raised position and simultaneously hold the recording arm 10 against swinging when the machine is not in operation, provision is made of a vertically movable lifting rod 20. The upper end of the lifting rod 20 carries a clamping shoe 21 adapted to engage the rear leg of a U-shaped head lifting bracket 22 which is secured to the rear of the recording head 11, whereby the stylus 13 may be lifted from the disk 17 and held in raised position.

The lifting rod 20 also carries a washer 23 for clamping a thin, resilient, clamping plate 24 which is secured to the upper surface of the arm 10 by means of screws 25, whereby said arm will be firmly held against horizontal swinging movement during the time that the head 11 is held in raised position.

It will be seen that the recording arm 10 and the clamping plate 24 are provided with arcuate slots 26, 27, respectively, whereby the arm 10 may swing without interference from the vertical lifting rod 20.

In order to regulate the pressure of the stylus 13 upon the disk 17, the weight of the recording head 11 is partially counterbalanced by means of a vertical leaf spring 28, which is secured to the forward end of the recording arm 10 and rotatably carries a horizontal adjusting screw 29 which is engaged in a tapped lug 30 upon the recording head 11. The lug 30 preferably is split and resiliently grips the adjusting screw 29 whereby accidental turning of said screw will be prevented.

It will be understood that the feed shaft 15 will normally swing the recording arm 10 across the record disk 17 at a constant slow speed when the turntable 18 is in rotation, so that the stylus 13 will form the grooves 16 in closely spaced spiral arrangement.

*Slip-friction feed*

Figure 8:
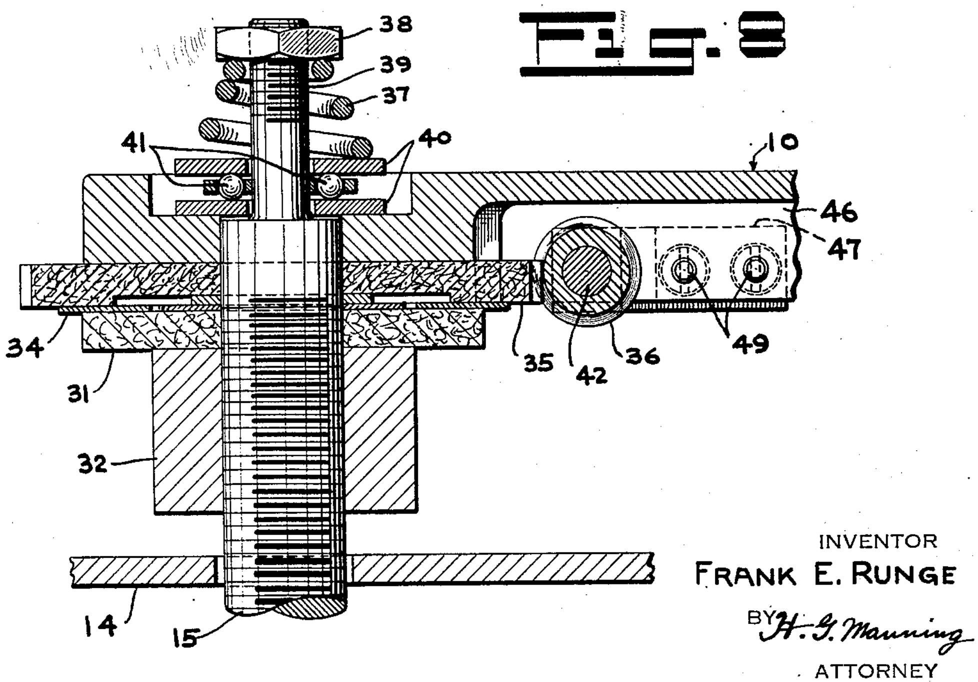
Fig. 8 is a cross sectional view of the rear end of the recording arm, showing the friction drive and the worm.

The recording arm 10 is operatively connected to the feed shaft 15 by means of a fiber slip-friction washer 31 (Fig. 8) which is supported upon the feed shaft 15 by a nut 32 fixed on said shaft by means of a set screw 33. The upper face of the fiber washer 31 is engaged by an intermediate steel friction washer 34 in contact with a fiber worm gear 35, which is normally held stationary with reference to the arm 10 by means of a lateral worm 36 meshed therewith.

The recording arm 10 is carried upon the upper end portion of the feed shaft 15 above the worm gear 35 and is pressed downwardly by a conical coiled spring 37 so as to maintain a degree of friction between the washer 31, the intermediate washer 34, and the worm gear 35 which is sufficient to drive the arm 10. This friction, however, will not prevent the operator from manually swinging said arm when desired.

The degree of said friction may be adjusted by means of a retaining nut 38 which is threaded upon a reduced upper end 39 of the feed shaft 15 above the conical spring 37. A pair of washers 40 having ball bearings 41 therebetween is interposed between the spring 37 and the arm 10, in order to prevent friction at this point from influencing the operation of the slip-friction washer 31.

The lateral worm 36 is fixed upon a worm shaft 42 (Fig. 7), which is journaled in apertures 43, 44, formed in depending side flanges 45, 46, respectively, of the recording arm 10. It will be noted that the aperture 44 in the side flange 46 is elongated, thereby permitting the worm 36 to be pressed toward the worm gear 35 and held in close engagement therewith by means of an inclined leaf spring 47, which bears against a rounded end 48 of the worm shaft 42 and is mounted upon the depending flange 46 by means of a pair of screws 49. Thus, there will be no lost motion or backlash between the worm gear 35 and the lateral worm 36.

The lateral worm 36 is adapted to be turned in a step-by-step movement by mechanism comprising a manually-depressible key 50 at the front of the recording head 11. The key 50 is integrally formed on a U-shaped lever 51 which extends in spaced relation around the front and sides of the recording head 11, and which is vertically swingable upon a pair of trunnions 52, 53 on the outer sides of the depending flanges 45, 46, respectively.

*Clutch*

The left side of the U-shaped lever 51 has an integral rearward extension 54 which is adapted to operate the worm shaft 42 by means of an automatic clutch indicated generally by the numeral 55.

Figures 5, 6:
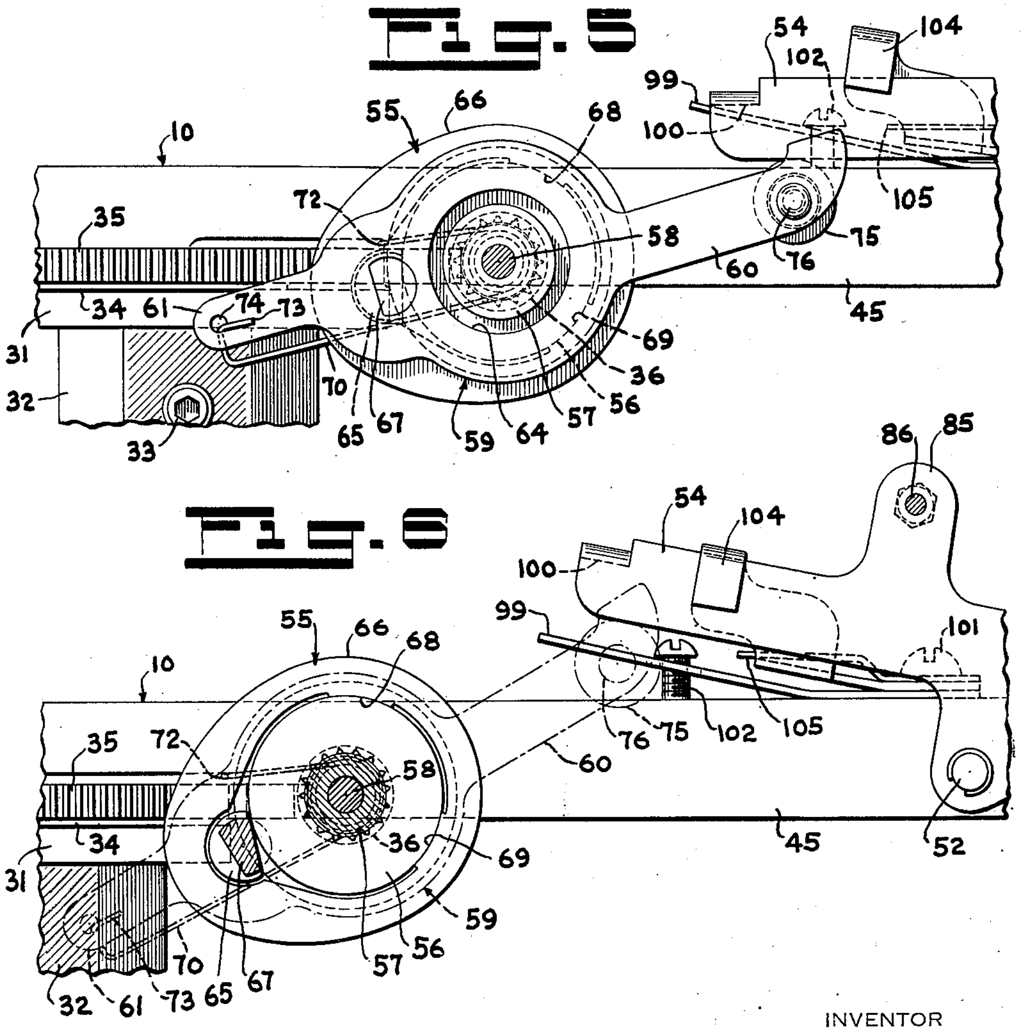
Fig. 5 is a fragmentary sectional side view on an enlarged scale showing the clutch as it would appear from a plane behind the outer retaining disk, with the parts in normal position.
Fig. 6 is a similar view, but showing the clutch as it would appear from a plane behind the clutch lever, and showing the parts as they would appear with the key depressed.
Figure 7:
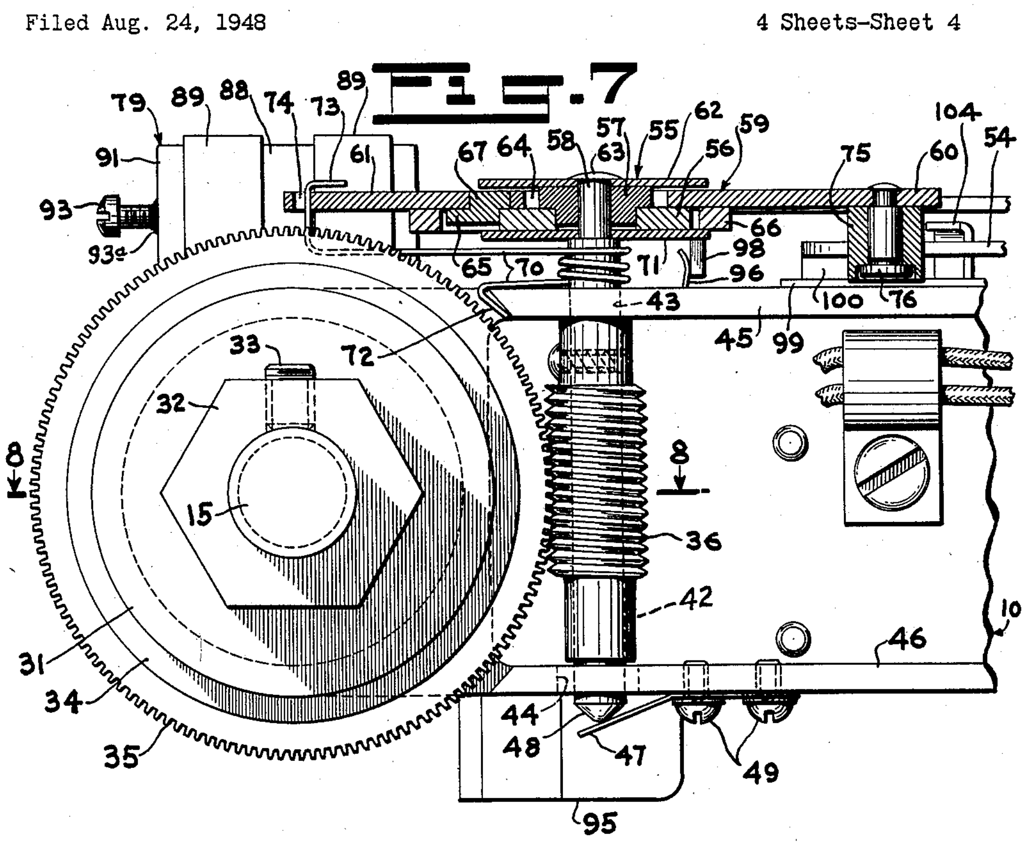
Fig. 7 is a bottom view of the same, looking upwardly, showing the clutch in section.

The clutch 55 comprises a hardened steel disk 56 having a force fit upon a hub 57 which is pressed onto a reduced end section 58 of the worm shaft 42 (Figs. 5, 6, and 7).

Provision is made of a clutch lever 59, which has a front arm 60 and a rear arm 61, and is loosely confined against the outer face of the steel disk 56 by means of an outer retaining disk 62. The reduced end 58 of the worm shaft 42 is headed over at 63 in order to secure said disk 62.

The central portion of the clutch lever 59 is enlarged and provided with an opening 64 which receives the hub 57 and is of ample size to permit considerable freedom of movement between the hub 57 and the lever 59.

A one-way automatic clutching action is obtained between the disk 56 and the lever 59 by means of a segment-shaped stud 65, which is fixed to the clutch lever 59 rearwardly of the opening 64, and a gripping ring 66 which embraces the stud 65 and the disk 56.

The stud 65 is secured to the clutch lever 59 by a reduced integral lug portion 67 (Figs. 6 and 7) which is forced into an opening in said lever, and also is segment-shaped to insure against rotation in said opening.

In order to improve the gripping action of the ring 66, said ring is provided with a pair of inwardly-projecting lands having gripping faces 68, 69 (Fig. 6) opposite the stud 65. Thus, a downward movement of the clutch lever arm 60 will turn the stud 65 sufficiently to bind the disk 56 against the gripping faces 68, 69, and the clutch lever 59 will be firmly coupled to the disk 66 as long as downward pressure upon the front arm 60 continues.

When the arm 60 is relieved of downward pressure, it will move upwardly under the influence of a two-armed wire spring 70 which is coiled around the worm shaft 42 between the side flange 45 and an inner retaining disk 71, the latter serving also to hold the gripping ring 66 loosely against the inner face of the clutch lever 69. This upward movement of the arm 60 will, of course, turn the stud 65 sufficiently to release the steel disk 56, thus permitting the latter to remain stationary.

The two-armed spring 70 has a hooked inner end 72 which is engaged under the arm 10, and a hooked outer end 73 which is engaged in an aperture 74 in the rear lever arm 61 to exert downward pressure thereon, so that said spring not only urges the front arm 60 upwardly, but also holds the stud 65 and the gripping faces 68, 69 of the ring 66 lightly against the steel disk 56 during reverse movement of the lever 59, thereby avoiding any lost motion in the clutch 55.

In order to operatively connect the front arm 60 and the extension 54 of the U-shaped lever 51, the lower edge of said extension 54 bears against an anti-friction roller 75 which is carried upon a headed stud 76 extending inwardly from said arm 60.

*Operating spring*

Figure 2:
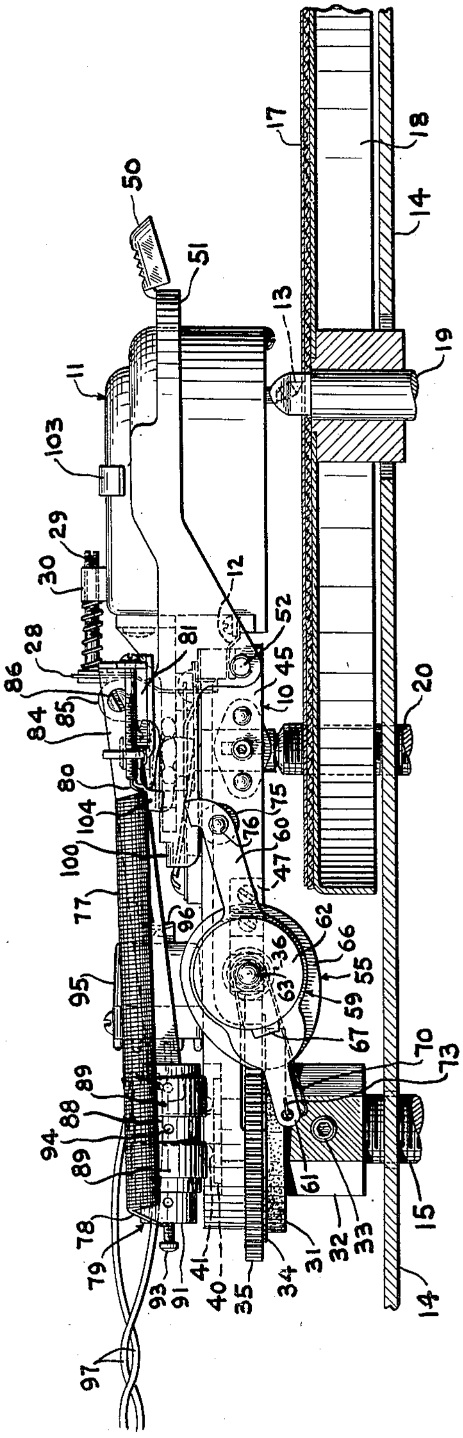
Fig. 2 is a side view of the same with the marker in normal position, certain parts being shown in section.
Figure 3:
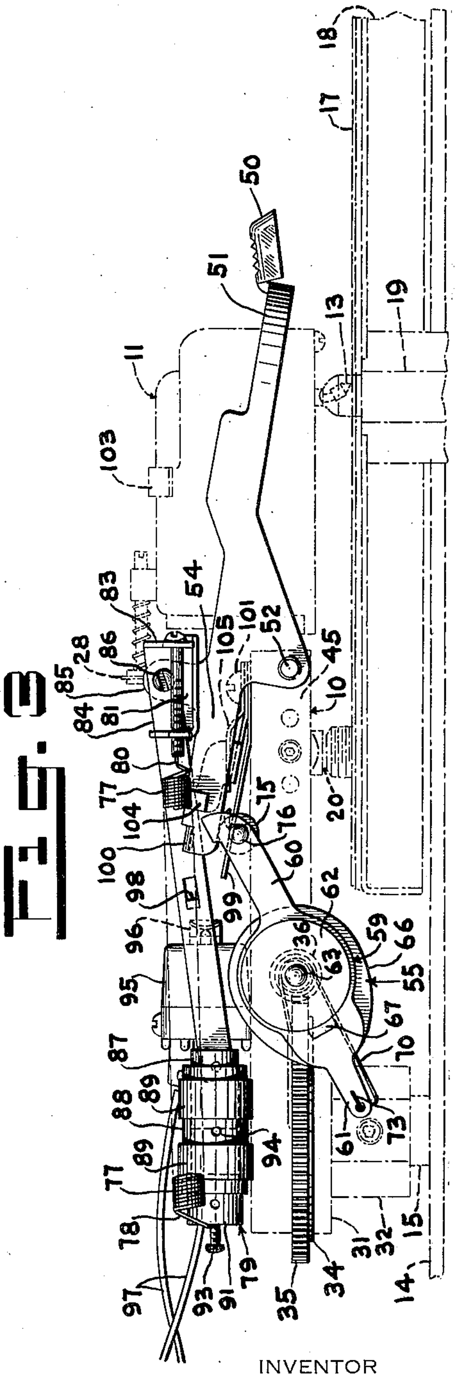
Fig. 3 is a view similar to Fig. 2, but showing the marker as it would appear with the key depressed, other parts being shown in broken lines.

The key 50 is normally held in a raised position (in which the clutch lever arm 60 will be depressed) by means of a relatively stiff coiled operating spring 77 (Figs. 1, 2, and 3). The spring 77 has a hooked rear end 78 which is anchored in an aperture in the rear end of a stationary dashpot 79 (to be further described hereinafter).

The spring 77 also has a hooked front end 80 which is operatively connected to the U-shaped lever 51 by means including an angular bracket 81 over which said hooked end is engaged. The bracket 81 is adjustably held by a headed screw 82 which is supported in an aperture in the outwardly-extending front end 83 of a dashpot connecting rod 84. The connecting rod 84 is secured adjacent its front end to an upwardly-extending lug 85 on the extension 54 of the U-shaped lever 51 by means of a pivotal connection 86.

Thus, manual depression of the key 50 will raise the extension 54 against the force of the coil spring 77, and thereby permit the clutch lever 59 to be moved counterclockwise by the two-armed spring 70.

When the operator releases the key 50, the coiled spring 77 will be permitted to depress the extension 54, thereby causing the automatic clutch 55 to turn the worm 36 and increase the spacing of the grooves 16 by swinging the recording arm 10 at increased speed.

*Dashpot*

Figure 4:
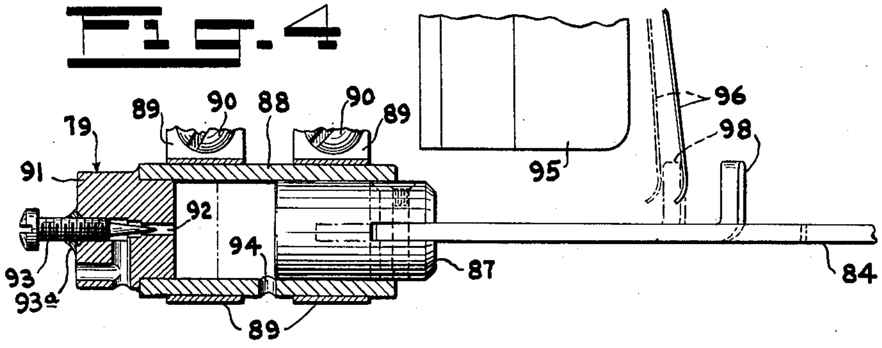
Fig. 4 is a sectional plan view on an enlarged scale, showing the dash pot and the switch.

In order that the swinging of the arm 10 shall be gradual, however, so as to preserve the continuity of the record grooves 16, the action of the spring 77 is retarded by a piston 87 in the dashpot 79 (Fig. 4), said piston being pivotally secured to the rear end of the dashpot connecting rod 84.

The dashpot 79 comprises a cylinder 88 which is fixed upon a side portion of the recording arm 10 adjacent the feed shaft 15 by means of a pair of straps 89 and screws 90, said cylinder receiving the piston 87 with an airtight sliding fit. The cylinder 88 is provided with a rear end closure 91 having an angular passage 92 in which an adjustable needle valve 93 is disposed, whereby air may bleed from the dashpot 79 at a controlled rate. The needle valve 93 is preferably secured against accidental change of adjustment by cement 93*a*.

In order to permit the dashpot 79 to be charged with air rapidly, an intake opening 94 is formed in the side wall of the cylinder 88 in such a position that it will be uncovered when the piston 87 has been withdrawn to a predetermined intermediate point in said cylinder.

*Turntable switch*

Inasmuch as the operator may wish to depress the key 50 when the turntable 18 is stationary, provision is made of a sensitive electric switch 95 for closing the turntable motor circuit, thereby insuring that the turntable 18 will be in rotation during the accelerated swinging of the recording arm 10, so that the stylus 13 will form a spiral groove rather than an abrupt angular mark.

The switch 95 is secured upon the arm 10 forwardly of the feed shaft 15, and is of the type having a spring arm 96 which will open the switch when pressed inwardly. A pair of wires 97 are provided for connection of the switch 95 in the motor circuit.

The spring arm 96 will be normally pressed inwardly by means of a laterally-extending lug 98 on the dashpot connecting rod 84. Thus, when the key 50 is depressed, the spring arm 96 will be released by forward movement of the lug 98, thereby closing the switch 95—said switch remaining closed for a time after the key 50 is released, because of the delaying action of the dashpot 79.

The normal upward return movement of the key 50 is limited by an inclined leaf overtravel spring 99 (Figs. 1, 5, and 6), which is adapted to be engaged by downward movement of a lug 100 at the rear end of the lever extension 54 and is secured to the upper surface of the arm 10 by means of a screw 101. The height of the rear end of the overtravel spring 99 is adjustable by means of a screw 102 which is threaded into the upper side of the arm 10, and preferably will be so adjusted as to halt the action of the coil spring 77 immediately after the point at which the laterally-extending lug 98 engages the switch arm 96 and opens the switch 95.

*Manual head-lifting device*

At times, the operator will desire to lift the recording head 11 so as to swing it manually in a lateral direction over the record disk. For this purpose, the top of the recording head 11 has a lateral cross arm 103 (Figs. 1 and 2) secured thereto so that when the operator lifts the key 50, the U-shaped lever 51 will engage the ends of said cross arm and thus lift the recording head 11 from the record disk 17. This operation will be permitted by the resilience of the overtravel spring 99, whereby the bracket 51 may be lifted beyond its normal stopping point.

In order to protect the disk 17 against injury and to gauge the action of the record marker, downward movement of the key 50 is limited by a hooked angular limiting spring 104, which is secured at its front end by the screw 101 and extends over the top of the bracket extension 54.

A stiff angular stop arm 105 also is secured above the angular limiting spring 104 by the screw 101 in order to prevent excessive deflection of said limiting spring.

*Operation*

A machine provided with the improved record marker herein disclosed will operate in the customary way, in which the stylus 13 will swing slowly across the record disk 17 at a constant speed so as to form the closely spaced record grooves 16 therein.

During dictation, when the operator wishes to indicate a point of correction, or any other point to which he desires to call the stenographer's attention, he will depress and release the key 50 once. This action will permit the coiled spring 77 to operate through the clutch 55 and the worm 36 to turn the worm gear 35, and thus swing the arm 10 at greater than its normal speed, so as to form visible indexing spaces shown at 106 and 107 in Fig. 1. The stylus 13 will remain in operation so that the continuity of the record grooves will be unbroken.

The dashpot 79 will, of course, be adjusted by means of the needle valve 93 so as to control the swinging of the arm 10 to permit the stylus 13 to produce a suitable gradual lead groove across the index space. It has been found that if the turntable operates at a speed of 33 R. P. M., for example, the needle valve 93 will preferably be adjusted to provide an operating interval of approximately ½ second.

If the operator wishes to provide an index mark which distinguishes from other marks in order to indicate a special point, such as a letter ending, he may depress the key 50 two or more times in succession, thereby forming a wider index space such as the space 108.

The record marker herein disclosed will operate even when the turntable 18 is not in normal operation, inasmuch as depression of the key 50 will cause the switch 95 to close and remain closed during the operation of the marker, thus causing the turntable 18 to rotate, and maintaining the continuity of the record groove across the index space.

The improved record marker will not interfere with manual swinging of the arm 10, inasmuch as the cross arm 103 permits the recording head 11 to be lifted by means of the key 50, and the slip-friction washer 31 will permit said arm to be swung, whether or not the feed shaft 15 or the worm 36 are in operation.

Further, the slip-friction washer 31 will permit the parts of the record marker to operate without damage if the key 50 should be accidentally depressed while the arm 10 is clamped in stationary position by the lifting rod 28. Such operation would, of course, be ineffective to provide an index space on the record disk.

One advantage of the improved record marker herein disclosed is that it will form index spaces upon a record disk which are easily visible to a stenographer or other person referring to the disk.

Another advantage is that the marker will be actuated by a simple movement of the key, and its operation will require no further attention on the part of the operator.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a motor driven phonographic machine having means for supporting and driving a record member, a recording stylus, a stylus support, and feed means for moving said stylus support laterally at a predetermined speed across a record member on said supporting and driving means; mechanism on said stylus support for increasing the speed of movement of said stylus support, manually operable means controlling said mechanism, and a motor operating switch operated by said mechanism for actuating said record supporting and driving means during the time said mechanism is in operation, whereby movement of the record will normally be insured during lateral movement of the stylus.

2. In a phonographic machine, a feed shaft, a recording arm on said feed shaft, a worm gear on said feed shaft, a worm rotatably carried on said recording arm and meshing with said worm gear, means for driving said worm, and a frictional connection between said feed shaft and said worm gear, whereby the recording arm may be swung selectively by rotation of the feed shaft or by operation of said worm, and said arm may be manually swung independently of the operation of said worm and said feed shaft.

3. The invention as defined in claim 2, including a manually swingable lever on said recording arm, and clutch means connecting said lever and said worm, said clutch means having elements engageable by operation of said lever, whereby the recording arm may be swung by operating said lever.

4. The invention as defined in claim 2, including a dashpot having a piston, and linkage connecting said piston and said lever for retarding swinging movement of said lever, whereby said arm may be swung at a predetermined speed.

5. In a phonographic machine having means for rotating a record member, a recording stylus, a feed shaft, and a stylus supporting arm mechanism including said feed shaft for moving said arm laterally with relation to a record member driven by said rotating means, and said mechanism further comprising a worm on said arm, a worm gear in mesh with said worm, said worm gear being frictionally and concentrically supported by said feed shaft, whereby rotation of said worm may move said arm for forming a spiral groove in said record member.

6. In a dictating machine having a disk record supporting turntable, a pivotally supported recording arm, means to drive said arm slowly over said turntable during normal recording, said recording arm having a stylus for forming grooves in said disk, key-operated mechanism mounted upon said recording arm and connected with said drive means for swinging said arm more rapidly than during normal recording for a predetermined short period of time, producing a relatively wide space having a groove of higher pitch than normal, a dash pot for retarding the operation of said more rapidly swinging mechanism, whereby said higher pitch groove will be smoothly connected with the adjacent grooves, and said space will form a visible indicator for the stenographer transcribing said record.

7. In a dictating machine having a turntable-carrying record disk, a shaft, a recording arm driven by said shaft, means to slowly rotate said shaft to swing said arm over said turntable at normal recording speed, said recording arm having a stylus for forming grooves in said disk; key-operated mechanism upon said recording arm and connected with said swinging means to advance said arm more rapidly than its normal speed, and means engageable by said swinging mechanism and comprising a turntable starting switch for maintaining rotation of said turntable during the operation of said swinging mechanism even if said turntable were previously at rest, whereby an abrupt change in the direction of the groove formed by the stylus will be avoided.

8. In a phonographic dictating machine having a record driving means, a recording stylus, a stylus support, means for moving said stylus support laterally across the record at a predetermined normal recording speed, mechanism connected to said stylus support for producing an indexing space by increasing the speed of movement of said stylus support across said record above normal speed imparted by said moving means, comprising a driving element, means for controlling the speed of operation of said driving element, means to repeatedly actuate said mechanism at the will of the operator during movement of said stylus support across the record, whereby the groove formed by said stylus will be continuous and the spacing between normally recorded sections thereof may be varied, and means connected to said mechanism for actuating said record driving means whenever said mechanism is in operation whereby movement of the record will be insured during lateral movement of the stylus and a smooth spiral groove will be formed thereon.

9. In a phonographic dictating machine having a record driving means, a recording stylus, a stylus support, means for moving said stylus support laterally across the record at a predetermined normal recording speed, key-operated repeatedly-actuatable mechanism connected to said stylus support for automatically moving said stylus support across said record at a speed greater than the normal recording speed for a predetermined short time to produce a relatively wide visible indexing space having a groove which is continuous with, and of greater pitch than the normally recorded adjacent grooves, means connected to said mechanism for actuating said record driving means whenever said mechanism is in operation, and automatically-operated means for causing said stylus support moving means to resume normal recording speed at the completion of said indexing space.

FRANK E. RUNGE.

REFERENCES CITED

The following references are of record in the file of this patent:

UNITED STATES PATENTS

| Number | Name | Date |
|---|---|---|
| 1,958,616 | Gent | May 15, 1934 |
| 2,262,732 | Gruber | Nov. 11, 1941 |